United States Patent

Nebon et al.

[11] Patent Number: 6,139,347
[45] Date of Patent: Oct. 31, 2000

[54] FIXING TERMINAL AND AN ELECTRICAL CONNECTION MODULE FOR A PLUG-IN CIRCUIT BREAKER

[75] Inventors: Jean-Pierre Nebon, Saint Martin le Vinoux; Claude Grelier, Grenoble; Frédéric Toti-Buttin, Pont de Claix; Yves Berguirol, Meylan, all of France

[73] Assignee: Schneider Electric SA, France

[21] Appl. No.: 09/206,944

[22] Filed: Dec. 8, 1998

[30] Foreign Application Priority Data

Dec. 18, 1997 [FR] France .................................. 97 16419

[51] Int. Cl.$^7$ ...................................................... H01R 13/64
[52] U.S. Cl. ............................................. 439/251; 439/821
[58] Field of Search ........................................ 439/251, 249, 439/821

[56] References Cited

U.S. PATENT DOCUMENTS

| | | |
|---|---|---|
| 2,029,028 | 1/1936 | Kneass et al. . |
| 2,243,567 | 5/1941 | Linde . |
| 3,594,697 | 7/1971 | Azbell ....................................... 439/251 |
| 3,778,748 | 12/1973 | Holman ..................................... 439/251 |

FOREIGN PATENT DOCUMENTS

| | | |
|---|---|---|
| 0063703 | 11/1982 | European Pat. Off. . |
| 2295593 | 7/1976 | France . |
| 1040102 | 10/1958 | Germany . |

*Primary Examiner*—Gary F. Paumen
*Attorney, Agent, or Firm*—Parkhurst & Wendel, L.L.P.

[57] ABSTRACT

The invention relates to an electrical fixing terminal for an electrical switchgear apparatus being disconnected by an axial withdrawal motion. In particular, an extractable circuit breaker, comprising a protruding part extending parallel to an axis of withdrawal and, defined by its external surface on the side where its free end is located a contact surface designed to cooperate with fixing jaws of a plug-in contact whose plug-in jaws are designed to cooperate by plug-in with an electrical plug-in terminal. The contact surface follows the outline of a cylinder sector of axis perpendicular to the axis of the protruding part, of opening angle greater than 180° and is designed to form a pivot for rotation of the plug-in contact around the axis of the cylinder. An application is plug-in multipole circuit breakers.

9 Claims, 6 Drawing Sheets

FIXING TERMINAL AND AN ELECTRICAL CONNECTION MODULE FOR A PLUG-IN CIRCUIT BREAKER

BACKGROUND OF THE INVENTION

The invention relates to a plug-in and pull-out mechanism for an electrical switchgear apparatus being disconnected by an axial withdrawal motion. In particular, the invention teaches an extractable circuit breaker connection mechanism designed to be moved in translation between a plugged-in position a pulled-out position and an extracted position, with respect to a fixed external frame. The frame is shaped to form a housing and comprises an opening on the front face enabling the circuit breaker to be extracted and rear wall opposite the opening. The rear wall is equipped with connection modules each comprising a part for electrical connection, in particular, to an external busbar, and a second part called connection module, comprising one or more connection terminals, for electrical connection to the circuit breaker terminals.

Electrical connection between the connection terminals and the circuit breaker terminals is performed by means of plug-in contacts which conventionally comprise two fingers separated by a spacer. A flexible return means tends to urge the fingers against the spacer. The ends of the two fingers facing one another on a first side of the spacer together form a first pair of jaws for clamping a terminal of the circuit breaker and the ends of the two fingers facing one another on the other side of the spacer form a second pair of jaws for clamping an internal part of a connection terminal attached to the frame. The opening movement of one pair of jaws causes a closing movement of the other pair of jaws by a lever effect.

The two pairs of jaws do not have the same functions. A first stage of the assembly operation is in fact performed whereas the switchgear apparatus is in the extracted position, giving access both to its rear face and to the internal face of the rear wall of the external frame. In this position, the plug-in contact is fixed by one of its pairs of jaws, called fixing jaws, to the corresponding terminal, called fixing terminal, which is then freely accessible to the operator.

In a second stage, the circuit breaker is inserted in a cavity of the external frame shaped in the form of a housing, by an axial movement which generates a relative translational movement towards one another of the jaws which are still free, called the plug-in jaws, of the terminal facing them, called the plug-in terminal. It is the movement which is used to achieve proper plug-in. That is to say insertion of a protruding part of the plug-in terminal between the plug-in jaws, forces the latter to open. Due to the presence of the fixing terminal between the fixing jaws, the latter jaws cannot move any closer to one another. The contact point between each fixing jaw and the fixing terminal then fulfills the role of pivot for the corresponding arm and the separation movement of the plug-in jaws generates separation of the fingers at the level of the spacer against the force of the flexible return means. The flexible return means provide, in the plugged-in position, the force necessary for permanent contact between the plug-in jaws and the plug-in terminals. Inversely, when pull-out takes place, the extraction movement of the circuit breaker must generate separation of the plug-in jaws and of the corresponding terminal, and in no case, separation between the fixing jaws and the fixing terminal.

The present invention relates more particularly to fixing of the fixing jaws to the fixing terminal, i.e., to the terminal on which the plug-in contact has to remain when the electrical switchgear apparatus is pulled-out, a terminal which consequently comprises means which contribute to securing the plug-in contact on the terminal when pull-out takes place.

Conventionally, an auxiliary fixing element such as a bolt can be provided for this fixing. The bolt cooperates with a bore made in the body of the terminal and with a frame of the plug-in contact, as described in U.S. Pat. No. 4,160,142. This solution complicates assembly and disassembly operations. The plug-in contacts are however considered as wearing parts which are capable of being inspected regularly and replaced, if required. With this type of device, maintenance operations are therefore complicated. Finally, the presence of an auxiliary fixing part increases the number of parts, which gives rise to extra cost.

It has therefore been proposed to use the flexible return means of the plug-in contact to perform closing of the fixing jaws on the fixing terminal, as is described, for example, in the document FR-A-2,583,217. The flexible return means are springs borne by the plug-in contact and tend to return the two fingers to a middle position in which the two pairs of jaws are partially open. The operator acts on the end of the plug-in jaws to move the latter towards one another and to open the fixing jaws by lever effect which engages the fixing jaws on a protruding part of the fixing terminal. Fixing by latching is achieved by positive cooperation between a notch provided on one of the fixing jaws and a latching edge of conjugate shape provided at one end of the corresponding terminal. The invention relates to the latter type of fixing, for which the profile of the fixing terminal contributes to holding the plug-in contact on the terminal when pull-out takes place, by cooperation with the fixing jaws.

In the latter type of gripping, dimensioning of the plug-in contact has to meet several contradictory requirements. First, the force exerted by the spring on the jaws must be sufficient to enable gripping of the gripping jaws but sufficiently weak to enable the plug-in contact to be opened by the operator acting on the end of the plug-in jaws. Moreover, once the fixing jaws have been fitted on the corresponding terminal, the plug-in jaws are not perfectly aligned with the plug-in terminal. This alignment fault may result from gripping of the plug-in contact, from the manufacturing tolerances between the fixed frame, the circuit breaker and the system for guiding the latter in translation, or from wear of these parts.

To overcome this alignment problem, it has been proposed in the document FR-A-2,624,660 to shape the plug-in contact and fixing terminal in such a way that in the plugged-in position the plug-in contact can take an oblique position with respect to the fixing terminal. But, control of the movement requires numerous moving parts interacting between the plug-in contact and the fixing jaws. Fitting of the plug-in contact on the fixing terminal becomes complex and unfixing the plug-in contact from the fixing terminal requires the plug-in contact to be completely disassembled, which is not compatible with the ease of the maintenance requirement referred to above.

It therefore proves necessary to propose a simple and inexpensive latching device enabling, on the one hand, fixing and unfixing of the plug-in contact and of the gripping terminal by simple pressure on the end of the plug-in jaws, and which moreover enables pivoting of limited amplitude between the plug-in contact and the fixing terminal.

SUMMARY OF THE INVENTION

This problem is solved, according to the present invention, by an electrical fixing terminal of a plug-in and pull-out mechanism for a switchgear apparatus being disconnected by an axial withdrawal motion. In particular, a plug-in circuit breaker, according to the invention, comprises a protruding part extending parallel to the withdrawal axis and defining on the side where its free end is located a contact surface designed to cooperate with the fixing jaws of a plug-in contact whose plug-in jaws are designed to cooperate by plug-in with an electrical plug-in terminal. The contact surface exactly following the outline of a cylinder sector of axis perpendicular to the axis of the protruding part has an opening angle greater than π radian or 180° and is designed to form a pivot for rotation of the plug-in contact around the cylinder axis.

The cylindrical shape of the contact surface makes it possible to ensure, in the plug-in phase, that the forces exerted by the plug-in contact on the terminal are appreciably independent from the angle taken by the plug-in contact. This reduces, for example, the risks of the plug-in contact becoming detached from or moving with respect to the terminal when plug-in takes place. In particular, in the course of plug-in, the plug-in terminals are not perfectly aligned with the fixing terminals, the cylindrical shape reduces detachment or displacement risks. Furthermore, this shape makes it possible to subsequently ensure in the plugged-in position that the contact conditions between the plug-in contact and the terminal are relatively independent from the angle which the plug-in contact takes with respect to the terminal. Finally the fact that the opening angle is greater than 180° also makes it possible to ensure that the plug-in contact is held on the fixing terminal when pull-out takes place. The structure of the terminal, which may be formed by a single block of material, is extremely simple. This shape enables manufacture by extrusion at low cost. In so far as an angular offset of the plug-in contact with respect to the terminal no longer has the consequence of tending to open the plug-in contact, and of increasing the contact forces, the wear of the contact surfaces of the terminal and of the plug-in contact is less; thus, lengthening the lifetime of these parts.

Advantageously, the cylinder sector is geometrically joined to the central part of the protruding part on each side by a groove appreciably parallel to the axis of the cylinder and forming a stop designed to limit pivoting of the plug-in contact around the axis of the cylinder.

Advantageously, the terminal comprises lateral positioning means, enabling each plug-in contact to be positioned along the axis of the cylinder, which may comprise at least one positioning notch arranged appreciably perpendicularly to the axis of the cylinder.

The advantages of the invention are particularly apparent when several connection terminals are electrically connected to one another and belong to a common electrical connection module. In this type of apparatus, described for example in U.S. Pat. No. 4,160,142, a multiplicity of plug-in contacts is used for each pole of the switchgear apparatus. The choice of the exact number of plug-in contacts used is made on site according to the destination of the switchgear apparatus, in particular, according to its rated current. However, the proximity of the plug-in contacts on the same connection module induces risks of mechanical interaction when plug-in takes place, in particular, if alignment faults exist. This leads, if conventional connection modules are used, to the plug-in contacts being separated from one another, to the detriment of compactness of the module.

Within this scope, the invention also relates to an electrical connection module comprising a plurality of connection terminals of cylindrical profile as defined previously. The precision of guiding of the plug-in contact in rotation around the axis of the cylinder of the terminal enables the plug-in contacts to be located very close to one another without any risk of mechanical interaction when plug-in is performed. In the case where some of the terminals are arranged in the extension of one another so that their cylinder axes are the same, the presence of the lateral positioning means provides additional safety. In the case where some of the terminals are arranged parallel to one another, limitation of the amplitude of potential rotation of the plug-in contacts by the stop means also provides additional safety. The overall assembly enables the compactness and simplicity of the switchgear apparatus to be considerably increased.

The multiplicity of the plug-in contacts for a single electrical pole enables the number of contact points to be increased, and therefore the global resistance of the connection to be reduced, resulting in a decrease of the electrical power dissipated in heat at the level of the connection if compared to a single terminal of equivalent volume.

The use of connection modules with multiple terminals, according to the invention, therefore enables the power dissipated per connection volume unit to be considerably reduced. The shape of the connection modules enables very simple manufacture by extrusion and sectioning of a single block of conducting material, preferably copper. A plug-in of very simple structure is obtained, delivering high performances with a small number of parts.

The effect of the terminals with the cylinder sector contact surface defined above on guiding by pivoting of the plug-in contact is already perceptible with conventional plug-in contacts. It is, however, enhanced when the plug-in contact designed to cooperate with a terminal, according to the invention, comprises at the level of the fixing jaws concave or, hollow fixing jaws in particular, of a shape following the outline of a cylinder of a radius equal to or greater than that of the contact surface of the terminal, or alternatively with a shape which is polygonal in straight cross-section.

With such a configuration, guiding of the plug-in contact in rotation is more precise, and it is possible to place the plug-in contacts closer to one another, in particular, in the case of a connection module with multiple terminals. In addition, the wear of the contact parts when plug-in and pull-out take place is minimized. Moreover, during the plug-in phase, the fixing jaws cooperate with a part of the cylindrical contact surface close to the end of the terminal whereas in the pull-out phase they can cooperate with a part of the cylindrical contact surface further away from the free end of the terminal. This mobility of the effective contact zone between the fixing jaws and the fixing terminal enables reversibility of plug-in to be achieved. In other words, it contributes to preventing the plug-in contact from being torn off from the fixing terminal during the pull-out phase.

The invention therefore also relates to an electrical connection mechanism for a switchgear apparatus with disconnection by axial withdrawal, in particular for a plug-in circuit breaker, comprising at least one fixing terminal as previously described and a plug-in contact comprising fixing jaws cooperating with the contact surface of the fixing terminal to form a pivot around the cylinder axis of the terminal, each fixing jaw having a surface called contact surface designed to cooperate with the contact surface of the terminal, of concave or hollow shape, in particular of cylindrical shape or having a polygonal straight cross-section, wherein said plug-in contact comprises plug-in jaws designed to cooperate with an electrical plug-in terminal.

It should be noted at this level that the fixing terminals, according to the invention, can be located either on the circuit breaker or on the internal part of the rear wall of the housing. The first arrangement, of the general type described in U.S. Pat. No. 4,160,152, has the advantage of allowing easy access to the plug-in contacts and gives the operator the assurance that the contact is not live when he handles the latter. However, this arrangement gives rise to an additional risk of knocks for the plug-in contacts since a circuit breaker is a heavy device which is not easy to handle. The second type of arrangement, described for example in FR-A-2,583, 217, presents the opposite advantages and drawbacks with respect to the previous arrangement.

BRIEF DESCRIPTION OF THE DRAWINGS

Other advantages and features will become more apparent from the following description of various embodiments of the invention, given as non-restrictive examples only and represented in the accompanying drawings, in which.

BEST MODE

Figure 1:
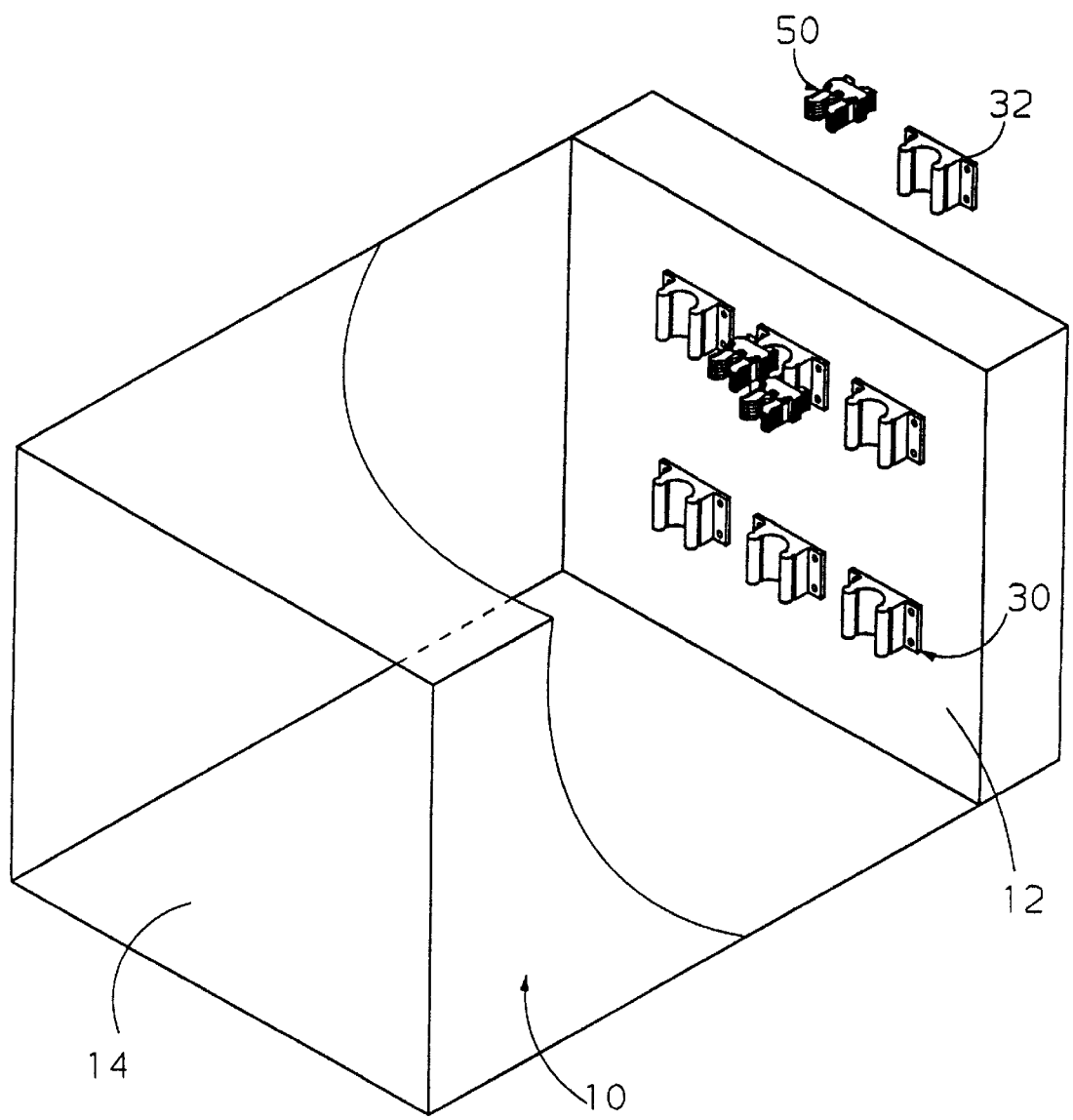
FIG. 1 is a partially cutaway schematic perspective view showing the rear wall of a frame and the location of the terminals and connection modules according to the invention.

In the figures, a fixed frame 10 is shaped as a parallelepipedic housing acting as support for a plug-in circuit breaker 20. The frame 10 comprises an opening 14 on the front panel enabling the circuit breaker to be inserted and extracted, and a rear wall 12 opposite the opening 14. Wall 12 is equipped with connection modules 30 each comprising a part 31 for external electrical connection to the housing, in particular to an external busbar (not represented), and a part 32, hereinafter called connection module, bearing one or more connection terminals 40, for electrical connection to the terminals of the circuit breaker 20.

Each pole of the circuit breaker 20 comprises several electrical terminals 22 which, in the plugged-in position, are each electrically connected to a connection terminal 40 of the corresponding connection module 30 by means of a plug-in contact 50.

The terminals 40 of the connection module 32 are fixing terminals, which means that the plug-in contacts 50 are fixed to the terminals 40 when the circuit breaker is extracted from the frame, and that they must remain so when plug-in and pull-out take place. Each module 32 comprises a base 33 for securing to the wall 12 and to the part 31 and a protruding part 42 extending according to an axis parallel to the withdrawal axis. The free end of protruding part 42 is shaped as a solid cylinder sector. A contact surface 44 is thus defined which exactly follows the outline of a cylinder sector of axis A—A perpendicular to the axis E—E of the protruding part 42 and with an opening angle α greater than π (pi) radian or 180°. The cylinder sector is geometrically connected to the central part of the protruding part 42 on each side by a groove 46 appreciably parallel to the axis of the cylinder. At its axial ends, the solid cylinder sector defines two edges 48 in a plane appreciably perpendicular to the axis A—A of the cylinder.

Plug-in contact 50 comprises a frame 56 which bears a spacer 59. A plurality of pairs of elementary fingers 52 are arranged inside the frame, each pair of fingers comprising a finger on each side of the spacer 59. The external wall of each finger 52 comprises two edges 53 at its longitudinal ends. One or more springs 58 are compressed between the edges 53 at their ends and an edge 57 of the frame 56 at their center. The pairs of fingers thus define on one side of the spacer a pair of plug-in jaws 54 and on the other side of the spacer a pair of fixing jaws 55.

Figure 2:
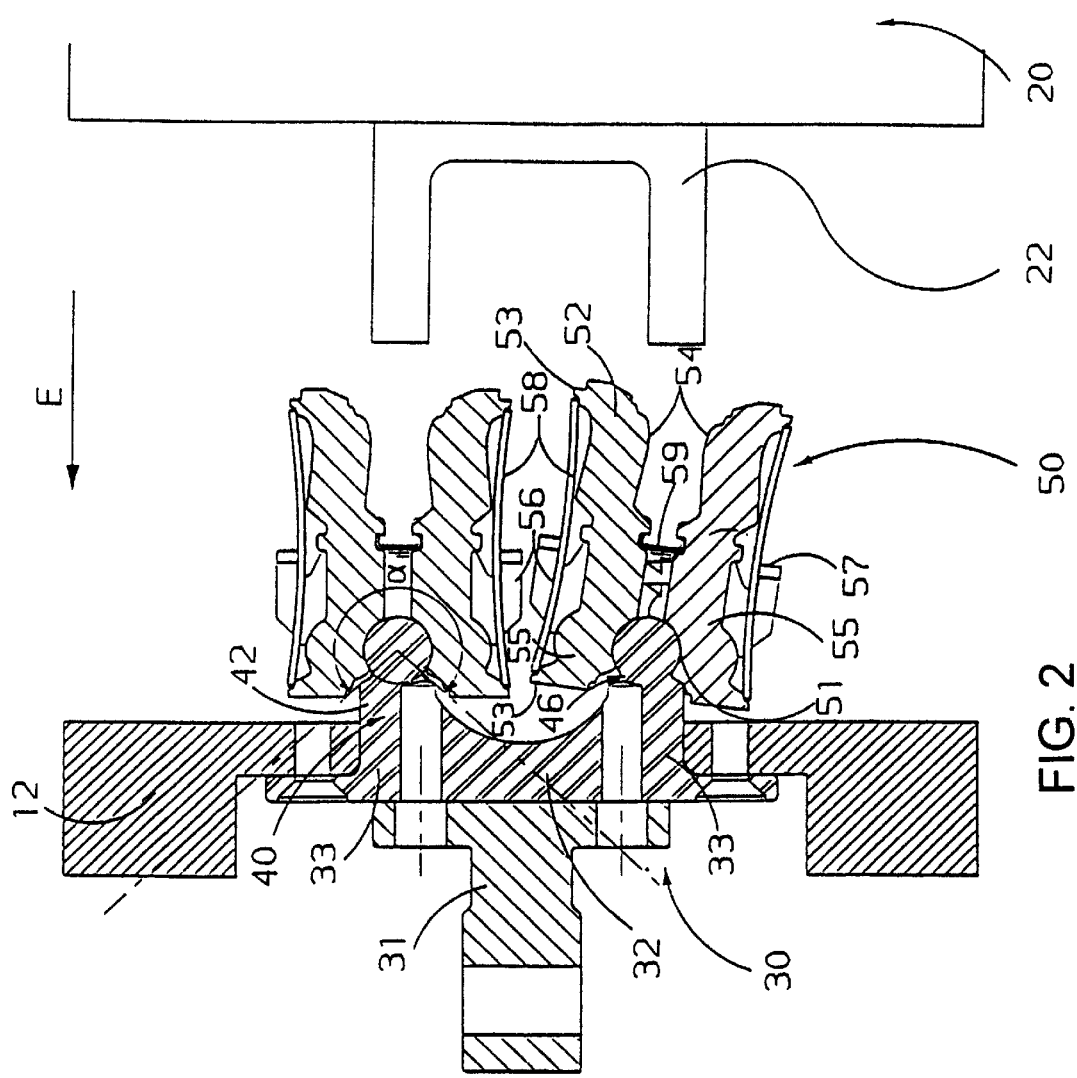
FIG. 2 is a cross-sectional view of a connection module according to the invention, with two terminals whose cylindrical axes are parallel and not in the same alignment.

FIG. 2 shows the fixing jaws 55 in contact with the cylindrical contact surface 44 of the terminal 40. This contact is made for each finger according to one or more generating lines parallel to the axis A—A of the cylinder. Considered in a plane perpendicular to the axis A—A, it is then pin-point or almost pin-point.

Figure 3:
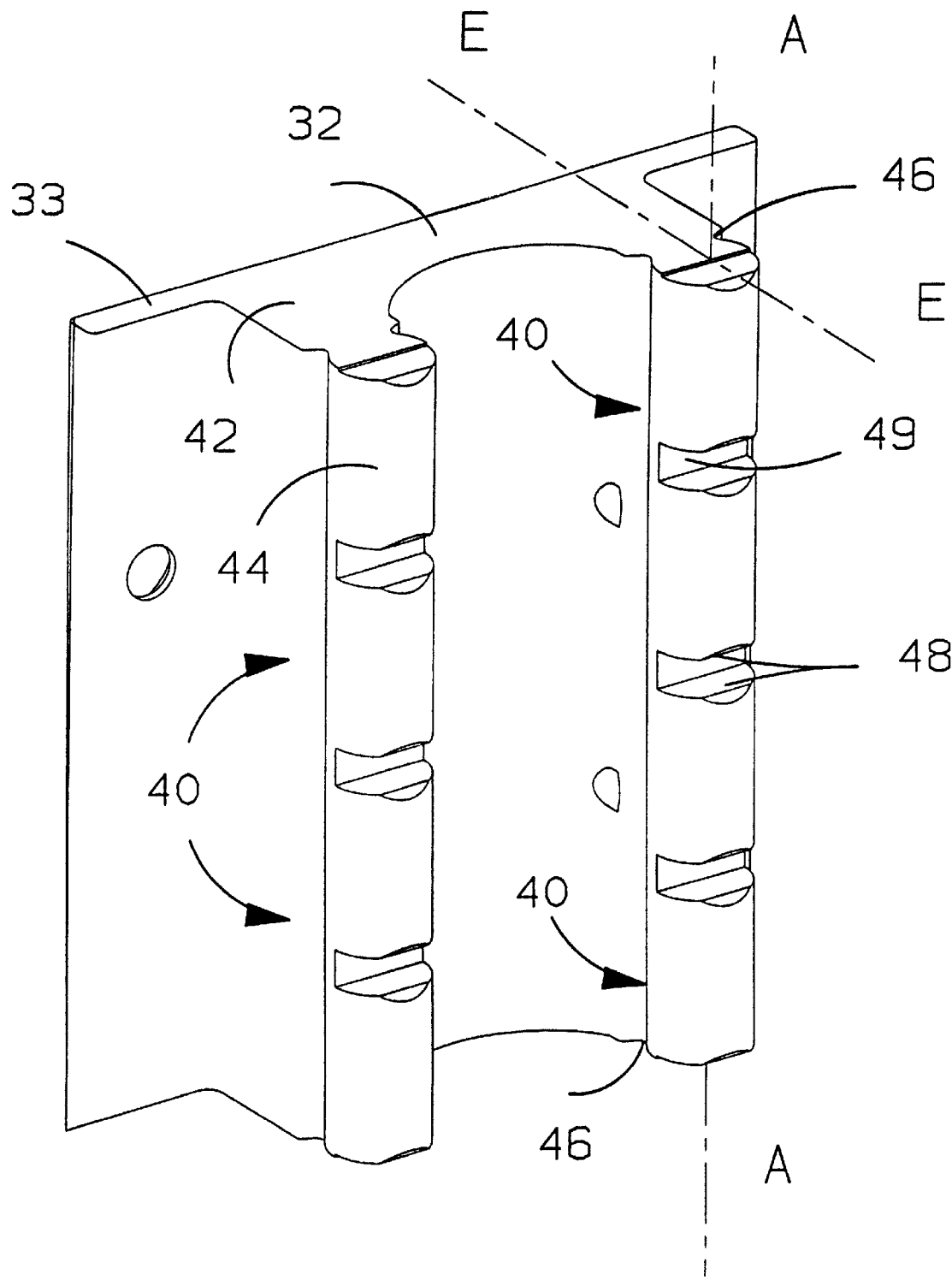
FIG. 3 is a perspective view of a connection module, according to the invention, comprising a plurality of terminals.
Figure 6:
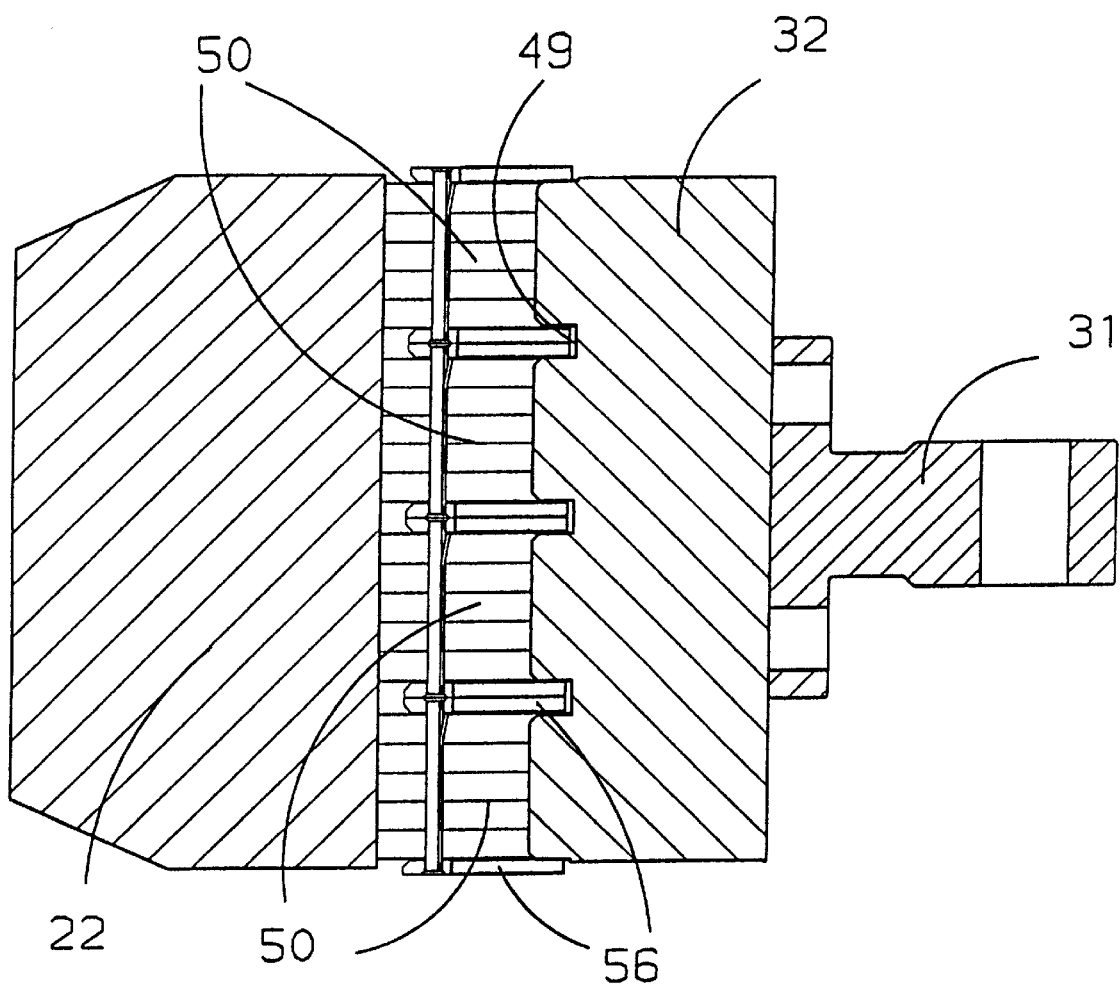
FIG. 6 is a cross-sectional view, in a plane comprising the axes E—E and A—A of FIG. 3, of a connection module, according to the invention, equipped with four plug-in connection contacts according to the invention.

Connection modules have been represented in FIGS. 1 to 3 comprising several terminals in the same block of material extruded, then sectioned at the level of notches 49 and of the axial ends. FIG. 6 shows how two of the edges of frame 56 of each plug-in contact 50 come into cooperation with side edge 48 (FIG. 3) of each notch 49, so as to achieve positioning and securing of the plug-in contact 50 with respect to axis A—A.

The corresponding terminals 22 of the circuit breaker may be insulated terminals or, for example, U-shaped profiled sections with a separation corresponding to that of the parallel axes of the cylinders of the connection module and are of equal height to that of the module.

Figure 4A:
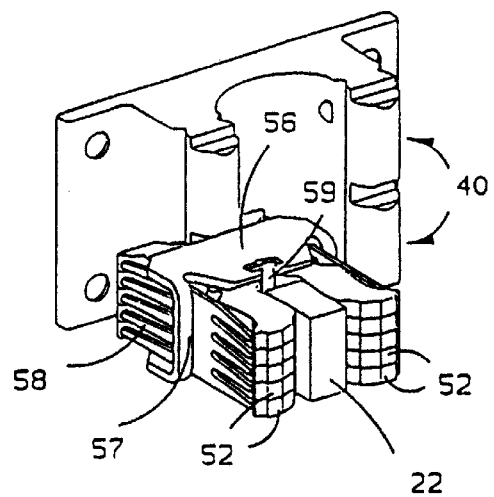
FIGS. 4A through 4C are perspective views of connection modules, according to the invention, cooperating with one or more plug-in connection contacts according to the invention.
Figure 4B:
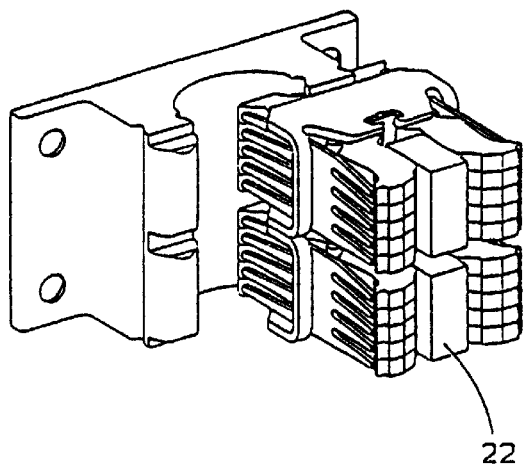
Figure 4C:
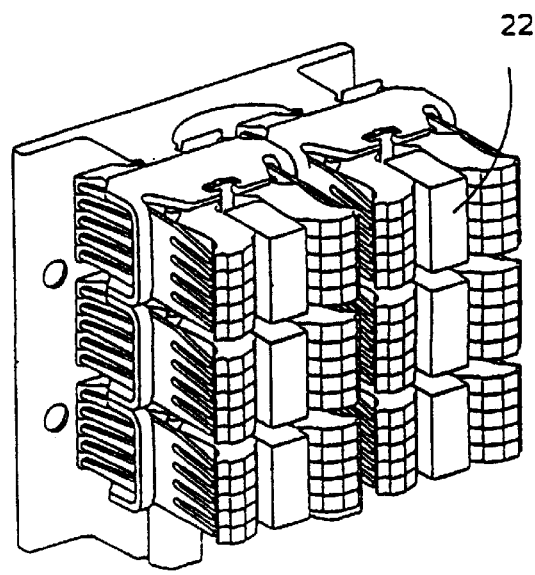

This type of connection module makes it possible to choose the number of plug-in contacts effectively used when commissioning is performed, in particular, according to the rated current and the electrodynamic withstand of the installation. Different connection possibilities have thus been represented schematically in FIGS. 4A to 4C.

The number and location of the plug-in contacts may also be determined by the choice of circuit breaker. There is, in fact, no really compulsory reason for having as many locations for the contacts on the circuit breaker and on the connection module. In fact, a single type of external frame with its rear wall 12 provided with connection modules 30 with multiple terminals may be used for different circuit breakers, some of which will have a small number terminals 22 or terminals enabling plug-in of a limited number of plug-in contacts, whereas others will enable connection of a larger number of plug-in contacts. This configuration thus enables a great flexibility of use to be obtained for a single frame.

Figure 5:
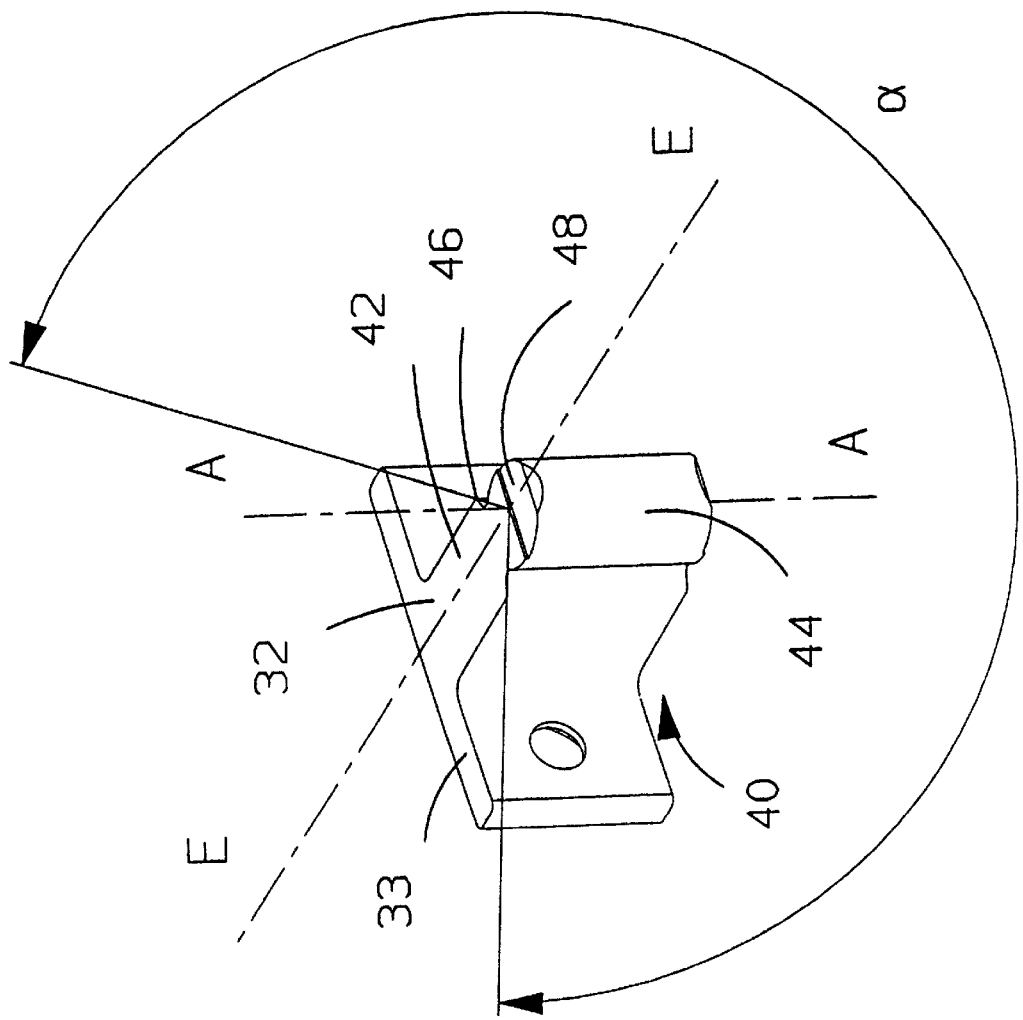
FIG. 5 is a perspective view of a connection module, according to the invention, comprising a single terminal.

As can be seen in FIGS. 3 to 5, the number of terminals along axis A—A may vary and can be chosen freely according to requirements and dimensions. Likewise, the numbers of rows may vary. The connection module may also comprise a single terminal only, as shown in FIG. 5. The edges 48 then serve the purpose of cooperation with the plug-in contact 50 to facilitate its positioning and limit its movement according to axis A—A.

The plug-in operation is performed in the following manner.

In a first stage, the switchgear is in the extracted position, that is to say, completely withdrawn from the external frame 10. Access to terminals 22 of circuit breaker 20 and to the internal face of rear wall 12 of external frame 10 is therefore free. In this position, the operator takes hold of the plug-in contact by its plug-in jaws 54 and moves the latter towards one another so as to open the fixing jaws against the force of the springs 58 and to clamp onto the cylindrical part of the terminal 40. Plug-in contact 50 can then pivot around axis A—A of the cylinder. The opening angle α greater than 180° of the cylindrical sector of terminal 40 ensures a large angular movement of the plug-in contact with a resultant of the modulus contact forces appreciably constant for each fixing jaw. This movement is precisely limited by the stops 46, as can be seen particularly in FIG. 2. In all the intermediate angular positions, the biasing of the springs 58 remains constant which means that the modulus of the resultant of the contact forces between the plug-in contact and the terminal is relatively independent from the angular positioning of the plug-in contact.

In a second stage, the circuit breaker 20 is inserted in the cavity of the external frame by an axial movement in the direction of the arrow E, which moves the plug-in jaws 54 and the corresponding plug-in terminal 22 towards one another. When the terminals 22 come into contact with the plug-in jaws 54, the tapered shape of the plug-in jaws enables guiding of the plug-in contact which pivots progressively around the axis A—A during the plug-in phase to compensate for any possible alignment faults between the fixing terminals, the mid-point axis of the contact, and the plug-in terminals. When the plug-in terminal is inserted between the plug-in jaws, it forces the latter to open. Due to the reaction to the contact between each fixing jaw and the fixing terminal, a progressive moving apart of the fingers takes place at the level of the spacer against the force of the springs 58. During plug-in, friction between the plug-in terminals 22 and the plug-in jaws 54 is generated at the level of the contact between the fixing jaws 55 and the fixing terminals 40 forces whose resultant has a greater than zero component according to the modulus axis E—E equal to the resultant of the friction forces and opposed to the latter. The point or the contact zone is far enough from the grooves 46.

In the plugged-in position, the springs 58 provide the force necessary for permanent contact between the jaws and the terminals. The modulus of the resultant of the contact forces at the level of the fixing jaws is greater at the end of this second stage of the plug-in operation than at the end of the first stage. Preferably, the dimensions of the plug-in contact, in particular, those of the spacer and the fixing jaws, are chosen in such a way that in the plugged-in position, the contact point or the center of the electrical and mechanical contact zone considered in a perpendicular cross-sectional plane A—A, i.e., at the end of a radius at right angles with the direction E—E, and that the direction of the resultant of the contact forces on each jaw, is perpendicular to the axis E—E and to the axis A—A.

In inverse manner, when pull-out is performed, the movement of the circuit breaker produces a friction between the plug-in terminals and the plug-in jaws, which generates forces on the terminal 40 in the plug-in axis. The angle of opening α greater than 180° of the cylindrical sector of the fixing terminal enables the plug-in contact to be held on the fixing terminal. In fact, the contact points between the plug-in contact and the terminal 40 can move towards the part of the contact surface 44 closest to the grooves 46, in a zone where a normal to the contact surface at the contact point has a greater than zero positive component in the direction of the arrow E. The resultant of the reaction of the terminal 40 on the fixing jaws 55 has a large component following the plug-in axis and a small component following the normal to the plug-in axis, which guarantees non-opening of the fixing jaws. It is therefore the plug-in jaws which separate from the plug-in terminals.

It can therefore be seen that, according to the different phases considered, the effective contact zones between the fixing jaws and the fixing terminal move over the cylinder sector contact surface 44, these zones provide the mechanical contact in all the phases, and also the electrical contact in the plugged-in position.

This movement is better controlled when the plug-in contact fixing jaws 55 themselves have a contact surface 51 of concave shape. This is the case for the embodiment of FIG. 2 for which the contact surface 51 of the fixing jaws 55 exactly follows a cylinder sector of the same radius as that of the contact surface 44. It can also be envisioned to shape the fixing jaws 55 according to a cylinder sector of slightly large radius than that used for the contact surface 44 which for certain applications enables the pin-point character of the contact to be better mastered without being detrimental to the necessary mobility of the contact point when plug-in and pull-out take place. Other hollow surfaces can also be envisioned for the fixing jaws 55, for example, polygonal surfaces approaching a cylinder sector of given radius, which enables the number of contact points to be multiplied.

The embodiments described do not present restrictive nature of any kind and the protection requested for the present invention covers in particular all the modifications and alternatives covered by the claims. For example, it is possible to join the two parts 31 and 32 of the connection module 30 in a single block of material. It is also possible to provide individual terminals which fix into a common base of the connection module. Securing of the connection module to the wall 12 can be achieved differently, for example, at the level of the part 31, or via the inside of the rear wall 12 of the frame. The structure of the plug-in contact may be different, for example with pivoting axes materialized for each finger or with different springs.

It should also be recalled that the assembly can be reversed, the fixing terminals are then securely affixed to the circuit breaker and the connection terminals become the plug-in terminals securely affixed to the rear wall of the frame.

What is claimed is:

1. An electrical connection mechanism for a switchgear apparatus disconnected by an axial withdrawal motion, comprising:

at least one fixing terminal comprising a protruding part extending along an axis parallel to an axis of withdrawal of the switchgear apparatus and defining on the side where a free end is located a contact surface that follows the outline of a cylinder sector of axis perpendicular to said axis of the protruding part, having an opening angle greater then π radian or 180°, a plug-in contact comprising fixing jaws having a contact surface of concave or hollow shape, cooperating with the contact surface of the fixing terminal to enable pivoting of the plug-in contact around a cylinder axis of the fixing terminal while ensuring that the modulus of a resultant of forces exerted by the plug-in contact on the fixing terminal is relatively independent from the angle taken from the plug-in contact, and plug-in jaws designed to cooperate with an electrical plug-in terminal by insertion of the plug-in terminal between the plug-in jaws.

2. The electrical connection mechanism according to claim 1, wherein the cylinder sector of the fixing terminal is geometrically joined to a central part of the protruding part on each side by a groove substantially parallel to an axis of the cylinder and forming a stop designed to limit pivoting of the plug-in contact around the axis of the cylinder.

3. The electrical connection mechanism according to claim 1, wherein the fixing terminal comprises positioning means that enable positioning of each plug-in contact along the axis of the cylinder.

4. The electrical connection mechanism according to claim 3, wherein the positioning means comprise at least one positioning edge arranged substantially perpendicularly to the axis of the cylinder.

5. An electrical connection assembly comprising a plurality of electrical connection mechanisms according to claim 1, whose fixing terminals are electrically connected to one another.

6. The electrical connection assembly according to claim 5, wherein at least one of the fixing terminals is arranged in the extension of another fixing terminal so that their cylinder axes are identical.

7. The electrical connection assembly according to claim 5, wherein some of the fixing terminals are arranged in such a way that their cylinder axes are parallel.

8. An electrical connection mechanism according to claim 1 further comprising a circuit breaker.

9. An electrical connection mechanism further comprising an external frame for a plug-in multipole circuit breaker according to claim 1.

* * * * *